United States Patent [19]

Golder

[11] Patent Number: 5,179,163

[45] Date of Patent: Jan. 12, 1993

[54] ELASTOMER COMPOSITIONS MADE FROM BLENDS OF COPOLYESTER ELASTOMERS AND COPOLYMERS OF ETHYLENE AND ETHYL ACRYLATE

[75] Inventor: Michael D. Golder, Allendale, N.J.

[73] Assignee: Hoechst Celanese Corporation, Summit, N.J.

[21] Appl. No.: 705,656

[22] Filed: May 24, 1991

Related U.S. Application Data

[62] Division of Ser. No. 350,232, May 11, 1989, Pat. No. 5,039,744.

[51] Int. Cl.$^5$ .............................................. C08L 67/02
[52] U.S. Cl. ..................................... 525/166; 525/92; 525/173; 525/176
[58] Field of Search .................. 525/166, 92, 173, 176

[56] References Cited

U.S. PATENT DOCUMENTS

| | | | |
|---|---|---|---|
| 3,578,729 | 5/1971 | Brinkmann | 525/176 |
| 4,013,613 | 3/1977 | Abolins | 525/166 |
| 4,223,106 | 9/1980 | Bier | 525/173 |
| 4,275,180 | 6/1981 | Clarke | 525/173 |
| 4,355,155 | 10/1982 | Nelsen | 528/301 |
| 4,739,012 | 4/1988 | Hagman | 525/92 |

Primary Examiner—Patricia A. Short
Attorney, Agent, or Firm—Herbert P. Price

[57] ABSTRACT

Molding compositions having improved flexibility are made from blends of segmented copolyester elastomers and copolymers of ethylene and ethyl acrylate.

8 Claims, No Drawings

ELASTOMER COMPOSITIONS MADE FROM BLENDS OF COPOLYESTER ELASTOMERS AND COPOLYMERS OF ETHYLENE AND ETHYL ACRYLATE

CROSS REFERENCE TO RELATED APPLICATION

This is a division of copending application, Ser. No. 7/350,232, filed May 11, 1989, now U.S. Pat. No. 5,039,744.

BACKGROUND OF THE INVENTION

The field of art to which this invention is directed is modified thermoplastic copolyester elastomers.

Segmented thermoplastic copolyester elastomers, which contain recurring polymeric long chain ester units derived from phthalic acids and long chain glycols and short chain ester units derived from phthalic acids and short chain glycols, are described in such patents as U.S. Pat. Nos. 3,651,014, 3,763,109 and 4,355,155.

Segmented thermoplastic copolyester elastomers have been blended with other compositions to modify their properties for specific end use applications. For example, segmented thermoplastic copolyester elastomers have been blended with low molecular weight epoxides to improve the melt stability as disclosed in U.S. Pat. No. 3,723,568.

Segmented thermoplastic copolyester elastomers, as described in U.S. Pat. Nos. 3,963,801 and 4,010,222, have been blended with ethylene-acrylic acid copolymers to improve the melt strength and blow molding processability.

U.S. Pat. No. 4,247,427 discloses hot melt adhesive composition made from blends of segmented thermoplastic copolyesters and low molecular weight polymers.

Ethylene-ethyl acrylate copolymers are described in Modern Plastics Encyclopedia as being among the toughest and most flexible of the polyolefins. These copolymers are often blended with other polyolefins, e.g., low density polyethylene, to produce intermediate-modulus products having many of the best properties of both polymers.

High impact resistant polymer blends, as described in U.S. Pat. Nos. 3,578,729 and U.S. 3,591,659, are made from ethylene-acrylic acid ester copolymers in admixture with linear saturated polyesters.

In U.S. Pat. No. 3,937,757, molding compositions having improved tracking resistance are disclosed, such compositions being blends of polybutylene terephthalate and polyolefins, e.g., ethylene-ethyl acrylate copolymers.

Other patents which describe blends of ethylene-ethyl acrylate copolymer and polyalkylene terephthalates are U.S. Pat. Nos. 3,953,394 and 4,324,869.

Research and development efforts are constantly being directed to developing polymer blends which have improved properties and economic advantages.

SUMMARY OF INVENTION

This invention is directed to thermoplastic copolyester elastomer compositions. In one aspect, this invention relates to blends of thermoplastic copolyester elastomers and ethylene-ethyl acrylate copolymers. In another aspect, this invention pertains to blends of thermoplastic copolyester elastomers and ethylene-ethyl acrylate copolymers further modified with other thermoplastic polymers.

The compositions of this invention are made from a blend of (A) about 50 to about 95 weight percent segmented thermoplastic copolyester elastomer and (B) about 5 to about 50 weight percent ethylene-ethyl acrylate copolymer, wherein said weight percentages are based on the total weight of (A) and (B). The segmented thermoplastic copolyester elastomer is comprised of a multiplicity of recurring long chain ester units and short chain ester units joined head to tail through ester linkages. The long chain ester units are represented by at least one of the following structures:

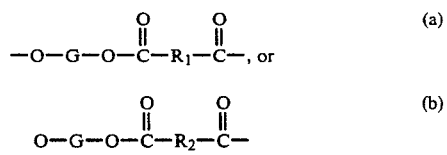

and the short chain ester units are represented by at least one of the following structures:

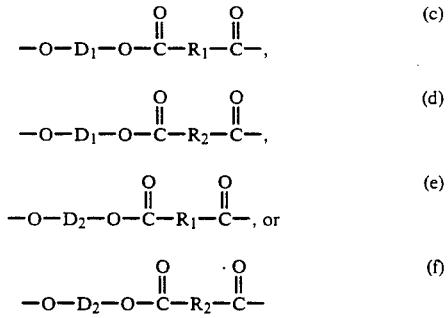

In the formulas, G is a divalent radical remaining after the removal of the terminal hydroxyl groups from a long chain polymeric glycol having a molecular weight above about 400 and a melting point below about 55° C.;

$R_1$ and $R_2$ are different divalent hydrocarbon radicals remaining after removal of carboxyl groups from different dicarboxylic acids, each having a molecular weight less than about 300; and $D_1$ and $D_2$ are different divalent radicals remaining after removal of hydroxyl groups from different low molecular weight diols having molecular weights less than about 250.

The short chain ester units in the thermoplastic copolyester provide about 25 to about 95 percent of the weight of said copolyester. About 50 to about 100 percent of the short chain ester units in the copolyester are identical.

The segmented thermoplastic copolyester, ethyleneethylacrylate copolymer blends of this invention can be further modified by the addition of a third component, such as polyalkylene terephthalate, polymethyl methacrylate, or methyl methacrylate-butadiene-styrene graft copolymers.

The ethylene-ethylacrylate copolymer plasticizes the blends resulting in constant or increased melt flow and reduced flexural modulus. The addition of other modifiers improves both the impact resistance and flexibility of the blends.

DESCRIPTION OF INVENTION

Thermoplastic copolyester elastomers useful in this invention are disclosed in detail in U.S. Pat. Nos. 3,651,014 and 4,355,155, which are hereby incorporated by reference.

The term "long chain ester units", as applied to units in the polymer chain of the thermoplastic copolyester elastomers refers to the reaction product of a long chain glycol with a dicarboxylic acid. Such "long chain ester units" correspond to the structures identified as (a) and (b) hereinabove. The long chain glycols are polymeric glycols having terminal (or as nearly terminal as possible) hydroxy groups and a molecular weight above about 400 and, preferably, from about 600 to about 6,000. The long chain glycols used to prepare the copolyesters are generally poly(oxyalkylene) glycols or glycol esters of poly(oxyalkylene) glycols and dicarboxylic acids.

The term "short chain ester units", as applied to units in the polymer chain, refers to low molecular weight compounds or polymer chain units having molecular weights less than about 550. They are made by reacting a low molecular weight diol (molecular weight below about 250) with a dicarboxylic acid to form repeating units corresponding to the structures identified as (c), (d), (e) and (f) hereinabove.

The term "dicarboxylic acid" as used herein is intended to include the condensation polymerization equivalents of dicarboxylic acids, i.e., their esters or ester forming derivatives, such as acid chlorides, anhydrides, or other derivatives which behave substantially like dicarboxylic acids in a polymerization reaction with a glycol.

The copolyesters used in this invention are prepared by polymerizing with each other (a) one or more dicarboxylic acids or their equivalents, (b) one or more long-chain glycols, and (c) one or more low molecular weight diols. The polymerization reaction can be conducted by conventional procedures, as for example, in bulk or in a solvent medium which dissolves one or more of the monomers.

The dicarboxylic acids used in making the copolyesters have molecular weights less than about 300. They can be aromatic, aliphatic or cycloaliphatic. These dicarboxylic acids can contain any substituent groups which do not interfere with the polymerization reaction. Examples of useful dicarboxylic acids are orthophthalic acid, isophthalic acid, terephthalic acid, bibenzoic acid, bis(p-carboxyphenyl) methane, p-oxy(p-carboxylphenyl) benzoic acid, ethylene bis(p-oxybenzoic acid) 1,5-naphthalene dicarboxylic acid, 2,7-naphthalene dicarboxylic acid, phenanthralene dicarboxylic acid, 4,4'-sulfonyl dibenzoic acid, and the like, as well as $C_1 - C_{10}$ alkyl and other ring substituted derivatives thereof, such as halo, alkoxy or aryl derivatives. Hydroxy acids, such as p(beta-hydroxyethyoxy) benzoic acid can also be used provided an aromatic dicarboxylic acid is also present.

Additional useful dicarboxylic acids are sebacic acid, 1,3-or 1,4-cyclohexane dicarboxylic acid, adipic acid, glutaric acid, succinic acid, oxalic acid, azelaic acid, fumaric acid, 4-cyclohexene-1,2-dicarboxylic acid, pimelic acid, suberic acid, 2,2,3,3-tetramethylsuccinic acid, and the like.

Preferred dicarboxylic acids are aromatic acids containing 8-16 carbon atoms, the cyclohexane-dicarboxylic acids and adipic acids. Particularly preferred dicarboxylic acids are terephthalic acid and isophathalic acid, or mixtures thereof. Mixtures of terephthalic acid and isophthalic acid wherein about 1 to about 20 percent by weight of the mixture is isophthalic acid are used when products of lower flexural modulus are desired.

The long chain glycols used in making the copolyesters have molecular weights of about 400 to about 6000, a melting point less than about 55° C. and a carbon to oxygen ratio equal to or greater than 2.0. Useful long chain glycols include those derived from 1,2-alkylene oxides wherein the alkylene group contains 2 to about 10 carbon atoms, examples of which are ethylene oxide, 1,2-propylene oxide, 1,2-butylene oxide and 1,2-hexylene oxide. Other useful long chain glycols are random or block copolymers of ethylene oxide and 1,2-propylene oxide. Preferred long chain glycols are poly(oxytetramethylene) glycols which are derived from tetrahydrofuran. A particularly preferred long chain glycol is poly(oxytetramethylene) glycol which has an average molecular weight of about 1000.

Useful low molecular weight diols which react to form short chain ester units of the copolyester include such diols as ethylene glycol, propylene glycol, 4-butanediol, 1,4-butenediol, 1,6-hexamethylene glycol, dihydroxycyclohexane, cyclohexane dimethanol, resorcinol, hydroquinone, 1,5-dihydroxy naphthalene, bisphenol A and the like. Equivalent ester forming derivatives of diols, e.g., ethylene oxide or propylene carbonate, are also useful. Preferred diols are 1,4-butanediol and 1,4-butenediol, or mixtures of the two. Such a preferred mixture is one wherein about 10 to about 40 weight percent, most preferably about 20 to about 30 weight percent, of the mixture is 1,4-butenediol.

In producing the polyesters of this invention, a single long chain glycol or a mixture of glycols can be used. In the latter case, there will be more than one G unit in the polymer chain and the number of different long chain units will be proportionately increased. In any event, the long chain glycols react with at least one low molecular weight diol and at least one dicarboxylic acid to form a thermoplastic polyester in which long and short chain ester units are connected head-to-tail through ester linkages.

In place of a single low molecular weight diol, a mixture of such diols can be used; in place of a single long chain glycol, a mixture of such compounds can be used, and in place of a single low molecular weight dicarboxylic acid a mixture of two or more can be used. Thus, the letter G in the structures shown hereinabove can represent the residue of a single long chain glycol or the residue of several different glycols, and the letters $D_1$ and $D_2$ can represent the residues of one or several low molecular weight diols and the letters $R_1$ and $R_2$ can represent the residues of one or several dicarboxylic acids.

Short chain ester units must contribute about 25 to about 95 weight percent of the copolyester, preferably about 45 to about 65 percent, and it is important that about 50 to about 100 percent of the total short chain ester units be identical, that is be the reaction product of a single low molecular weight diol and a single low molecular weight dicarboxylic acid. These units will normally be distributed statistically throughout the polymer backbone.

The copolyesters are prepared from the components under well known condensation polymerization conditions at temperatures of about 150° to about 260° C., preferably about 225° to about 260° C.

The ethylene-ethyl acrylate copolymers useful in this invention are the normally solid copolymers of ethylene and ethyl acrylate containing about 2 percent to about 30 percent by weight of ethyl acrylate and having densities of about 0.91 to about 0.94 gm per cc at 23° C. U.S. Pat. No. 2,953,541 which is hereby incorporated by reference, describes ethylene-ethyl acrylate copolymers in detail.

The compositions of this invention are made from a blend of (A) about 50 to about 95 weight percent segmented thermoplastic copolyester elastomer and (B) about 5 to about 50 weight percent ethylene-ethyl acrylate copolymer, said weight percents being based on the total weight of (A) and (B).

The compositions of this invention can also be modified with a third component, e.g., acrylic polymers. Up to about 30 weight percent of the segmented thermoplastic copolyester elastomer - ethylene-ethyl acrylate copolymer blend can be replaced with polymethylmethacrylate.

Blends of segmented thermoplastic elastomer copolymers and ethylene-ethyl acrylate copolymers can be modified with a polyalkylene terephthalate, preferably polybutylene terephthalate, alone or also with methyl methacrylate-butadiene-styrene graft copolymers.

Up to about 85 weight percent of the segmented polyester elastomer in the polyester elastomer, ethylene-ethyl acrylate blend can be replaced with polyalkylene terephthalate or a mixture of polyalkylene terephthalate and methylmethacrylate-butadiene-styrene graft copolymer, wherein the amount of segmented thermoplastic elastomer and polyalkylene terephthalate is more than 50 weight percent of the blend and at least 15 weight percent of the total composition is segmented polyester elastomer.

In preparing the compositions of this invention, the polymeric components, in granular or powder form, are tumble blended, followed by melt compounding on single screw or twin screw extruders. The blends are then injection molded into test specimens.

The following examples describe the invention in more detail. Parts and percentages unless otherwise designated are parts and percentages by weight. The compositional data and physical properties of the copolyester elastomers used in the examples are as follows:

TABLE A

| Copolyester | A | B |
|---|---|---|
| Shore D Hardness | 47 | 55 |
| Wt % Hard Segment | 53 | 62 |
| Wt % Soft Segment | 47 | 38 |
| Melting point °C. of copolyester | 178 | 184 |
| Melt Index (220° C. and 2160 Gm) | 11.5 | 11.5 |
| Inherent Viscosity | 1.0 | 1.0 |

The copolyesters contain both 1,4-butenediol (B2D) and 1,4-butanediol (B1D) in the hard segments in a mole ratio of B2D/(B1D + B2D)=0.25.

EXAMPLE 1

Copolyester elastomer A described in Table A was tumble blended with an ethylene-ethyl acrylate copolymer (Bakelite Ethylene Copolymer DPDA - 6182 Natural - Union Carbide Corporation), was melt compounded on a twin screw extruder at 420° F. and at 200 RPM, and was injection molded at 420° F. into test bars.

The melt flow rate values (MFR) were determined according to ASTM D-1238, and the flex modulus was determined according to ASTM D 790. The results of these tests are listed in the following table.

TABLE 1

| Example | 1A | 1B | 1C | 1D | 1E |
|---|---|---|---|---|---|
| Copolyester Elastomer A, parts | 50 | 63 | 75 | 87.5 | 100 |
| Ethylene-Ethyl Acrylate, parts | 50 | 37 | 25 | 12.5 | |
| Flex Modulus, psi | 11,000 | 12,000 | 14,000 | 15,000 | 17,000 |
| MFR at 220° C. | 13.4 | 16.1 | 14.4 | 20.1 | 14.3 |

As can be seen from these examples, ethylene-ethyl acrylate copolymers plasticize the copolyester elastomer resulting in constant or increased melt flow and reduced flex modulus. Compositions wherein the ethylene-ethyl acrylate copolymer was replaced by Surlyn, a neutralized ethylene-acrylic acid copolymer from Dupont (as described in U.S. Pat. No. 3,963,801), resulted in blends having high melt viscosities or no plasticization.

EXAMPLE 2

Using the procedure described in Example 1, with the exception that the temperature of the melt compounding was 480° F., molding compositions were prepared from copolyesters A and B described in Table A, the ethylene-ethyl acrylate copolymer (EEA) described in Example 1, and polybutylene terephthalate (PBT) having an intrinsic viscosity of 0.75. Compositional data and test results are shown in Table 2. The notched Izod impact test was conducted according to ASTM D-256.

TABLE 2

| Example | 2A | 2B | 2C | 2D | 2E | 2F |
|---|---|---|---|---|---|---|
| Copolyester A | 60 | 45 | | | | 10 |
| Copolyester B | | | 70 | 56 | 45 | |
| EEA | | 25 | | 20 | 25 | 40 |
| PBT | 40 | 30 | 30 | 24 | 30 | 50 |
| Copolyester/PBT | 1.5 | 1.5 | 2.33 | 2.33 | 1.5 | |
| Flex Modulus, psi | 114M | 64M | 91M | 60M | 74M | 69M |
| Notched Izod (72° F.) ft lb/in of notch | 4.6 | NB | NB | NB | NB | — |

As demonstrated by this example, EEA flexibilizes compositions at both constant copolyester/PBT ratio (Ex. 2A vs. 2B vs 2E and 2C vs 2D) and PBT/ (EEA +copolyester) ratio (Ex 2B vs. 2C vs 2E).

EXAMPLE 3

Using the procedure described in Example 1, molding compositions were prepared from copolyester elastomer A described in Table A, the PBT described in Example 2, the ethylene-ethyl acrylate copolymer described in Example 1 and a methylmethacrylate polymer (PMMA) (Plexiglas VM100 Rohm & Haas Company). Compositional data and test results are shown in Table 3. A molding composition was also prepared from copolyester A, PMMA and core-shell modifier KM 330 - Rohm & Haas Company having a rubbery acrylate core and a hard shell of methylmethacrylate.

TABLE 3

| Example | 3A | 3B | 3C | 3D | 3E |
|---|---|---|---|---|---|
| Copolyester A | 75 | 65 | 55 | 45 | 55 |
| EEA |  | 10 | 20 | 30 |  |
| PMMA | 25 | 25 | 25 | 25 | 25 |
| Core-shell Modifier |  |  |  |  | 20 |
| Notched IZOD (D256) (72° F.) ft lb/in of notch | 2.4 | 5.5-NB | NB | 3.7 | 3.3 |

These examples demonstrate the improvement in impact resistance obtained from copolyesters and ethylene-ethyl acrylate copolymers plus polymethylmethacrylate. Example 3C compared with 3E shows the improvement in impact resistance obtained when a core-shell impact modifier is replaced with the ethylene-ethyl acrylate copolymer. It would be expected that the core-shell modifier which has a polymethacrylate shell would be more compatible with the polymethylmethacrylate, thus resulting in higher impact resistance.

EXAMPLE 4

Using the procedure described in Example 2, molding compositions were prepared from copolyester elastomer A described in Table A, polybutylene terephthalate described in Example 2, ethylene-ethyl acrylate copolymer described in Example 1 and methyl methacrylate-butadiene-styrene (MBS) prepared as described in U.S. Pat. No. 4,304,709-Kane Ace B-56 (Kanegafuchi Chemical Industry Co.) and Metablen C-223 (M&T Chemical) Compositional data and test results are shown in Table 4.

TABLE 4

| Example | 4A | 4B | 4C | 4D | 4E | 4F |
|---|---|---|---|---|---|---|
| Copolyester A | 35 | 20 | 24 | 24 | 18 | 12 |
| PBT | 25 | 35 | 40 | 48 | 54 | 60 |
| EEA | 10 | 15 | 16 | 8 | 8 | 8 |
| MBS (KANE-ACE) | 30 | 30 |  |  |  |  |
| MBS (Metablen) |  |  | 20 | 20 | 20 | 20 |
| Notched Izod (D-256) | NB | NB | NB | NB | NB | NB |
| Flex Modulus M, psi | 34 | 45 | 80 | 87 | 128 | 137 |

These examples show that impact resistant compositions with low flex moduli can be obtained provided a sufficient amount of copolyester elastomer is in the blend.

EXAMPLE 5

Using the procedure described in Example 2, molding compositions were prepared from copolyester A described in Example A, the polybutylene terephthalate described in Example 2, the ethylene-ethylacrylate copolymer of Example 1 and the MBS polymer (Metablen) of Example 4. Compositional data and test results are shown in Table 5.

TABLE 5

| Example | 5A | 5B | 5C | 5D | 5E | 5F | 5G |
|---|---|---|---|---|---|---|---|
| Copolyester A | 6.5 | 12 | 12 | 14 | 18 | 24 | 10.9 |
| PBT | 57.5 | 60 | 56 | 58 | 54 | 48 | 49.5 |
| Metablen | 25 | 20 | 20 | 20 | 20 | 20 |  |
| EEA | 16 | 8 | 12 | 8 | 8 | 8 | 39.6 |
| Break Tensile Strength-PSI (ASTM D638) | 2780 | 3090 | 2960 | 2880 | 3130 | 3490 | 2180 |
| Elongation at break - % | 65 | 90 | 70 | 92 | 240 | 325 | 60 |
| (ASTM D638) |  |  |  |  |  |  |  |

For a material to be a useful elastomer, it's tensile elongation at break must be at least 200%. As can be seen from the data shown in Table 5, when the copolyester concentration is less than 15%, poor elongation at break results.

The principles, preferred embodiments and modes of operation of the present invention have been described in the foregoing specification. The invention which is intended to be protected, herein, however is not to be construed as limited to the particular forms disclosed, since they are to be regarded as illustrative rather than restrictive. Variations and changes may be made by those skilled in the art without departing from the spirit and scope of the invention.

What is claimed is:

1. In a thermoplastic polymer composition consisting of:
    (A) about 50 to about 95 weight percent segmented thermoplastic copolyester elastomer; and
    (B) about 5 to about 50 weight percent ethylene - ethyl acrylate copolymer, said weight percents being based on the total weight of (A) and (B), wherein (A) the segmented copolyester elastomer is comprised of a multiplicity of recurring long chain ester units and short chain ester units joined head to tail through ester linkages, said long chain units being represented by at least one of the structures:

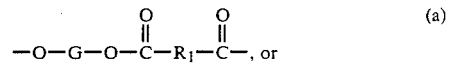

$$-O-G-O-\overset{O}{\underset{\|}{C}}-R_1-\overset{O}{\underset{\|}{C}}-, \text{ or} \quad (a)$$

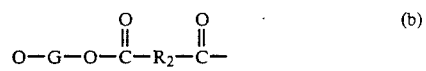

$$O-G-O-\overset{O}{\underset{\|}{C}}-R_2-\overset{O}{\underset{\|}{C}}- \quad (b)$$

and the short chain ester units are represented by at least one of the following structures:

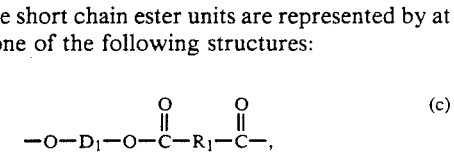

$$-O-D_1-O-\overset{O}{\underset{\|}{C}}-R_1-\overset{O}{\underset{\|}{C}}-, \quad (c)$$

$$-O-D_1-O-\overset{O}{\underset{\|}{C}}-R_2-\overset{O}{\underset{\|}{C}}-, \quad (d)$$

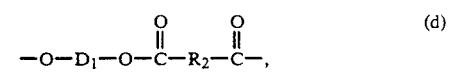

$$-O-D_2-O-\overset{O}{\underset{\|}{C}}-R_1-\overset{O}{\underset{\|}{C}}-, \text{ or} \quad (e)$$

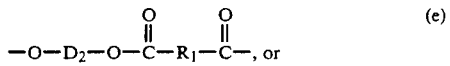

$$-O-D_2-O-\overset{O}{\underset{\|}{C}}-R_2-\overset{O}{\underset{\|}{C}}-, \quad (f)$$

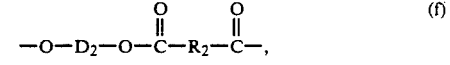

wherein G is a divalent radical remaining after the removal of the terminal hydroxyl groups from a long chain polymeric glycol having a molecular weight above about 400 and a melting point below about 55° C.;

wherein $R_1$ is the divalent radical remaining after removal of carboxyl groups from terephthalic acid and $R_2$ is the divalent radical remaining after removal of carboxyl groups from isophthalic acid;

wherein $D_1$ is the divalent radical remaining after removal of hydroxyl groups from 1,4-butanediol and $D_2$ is the divalent radical remaining after removal of hydroxyl groups from 1,4-butenediol provided said short chain segments amount to between about 25 and about 95 percent by weight of the copolyester and wherein about 50 to about 100 percent of the short chain ester units are identical; and wherein (B) the ethylene-ethyl acrylate copolymer is a normally solid copolymer of ethylene and ethyl acrylate containing about 20 to about 30 weight percent ethyl acrylate, the improvement which comprises replacing up to about 30 weight percent of (A) and (B) with an equal weight of polymethylmethacrylate.

2. The composition of claim 1 wherein the long chain polymeric glycol is a polyoxyalkylene glycol having a molecular weight of about 400 to about 6000.

3. The composition of claim 2 wherein the polyoxyalkylene glycol is polyoxyethylene glycol having a molecular weight of about 400 to about 2000.

4. The composition of claim 2 wherein the polyoxyalkylene glycol is polyoxytetramethylene glycol having an average molecular weight of about 1000.

5. The composition of claim 1 wherein the short chain segments amount to between about 45 percent and about 65 percent by weight of the copolyester.

6. The composition of claim 1 wherein about 10 percent to about 40 percent of the D groups represent hydrocarbon radicals remaining after removal of the hydroxyl groups from 1,4-butenediol.

7. The composition of claim 1 wherein 100 percent of the R groups are hydrocarbon radicals remaining after the removal of carboxyl groups from terephthalic acid.

8. The composition of claim 1 wherein between about 1 to about 20 percent of the R groups are hydrocarbon radicals remaining after removal of the carboxyl groups from isophthalic acid.

* * * * *